United States Patent
Malaise et al.

(10) Patent No.: US 11,499,450 B2
(45) Date of Patent: Nov. 15, 2022

(54) METHOD AND TROLLEY FOR HANDLING A RECTIFIER

(71) Applicant: SAFRAN AERO BOOSTERS SA, Herstal (BE)

(72) Inventors: Kevin Malaise, Herstal (BE); Michael Trafalski, Herstal (BE); Matthieu Droeller, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 161 days.

(21) Appl. No.: 16/648,921

(22) PCT Filed: Apr. 17, 2019

(86) PCT No.: PCT/EP2019/060003
§ 371 (c)(1),
(2) Date: Mar. 19, 2020

(87) PCT Pub. No.: WO2019/202036
PCT Pub. Date: Oct. 24, 2019

(65) Prior Publication Data
US 2020/0284167 A1    Sep. 10, 2020

(30) Foreign Application Priority Data
Apr. 20, 2018  (BE) .................................. 2018/5261

(51) Int. Cl.
*F01D 25/28* (2006.01)
*B23K 37/053* (2006.01)
(Continued)

(52) U.S. Cl.
CPC ........ *F01D 25/285* (2013.01); *B23K 37/0538* (2013.01); *B62B 3/10* (2013.01);
(Continued)

(58) Field of Classification Search
CPC ......... B23K 37/0538; B62B 3/10; B66F 5/00; F01D 25/285; F05D 2230/60; F05D 2230/68; F05D 2230/72; F05D 2230/80
See application file for complete search history.

(56) References Cited

U.S. PATENT DOCUMENTS

| 2,898,442 A | 8/1959 | Anderson et al. |
| 4,491,307 A | 1/1985 | Ellefson |

(Continued)

FOREIGN PATENT DOCUMENTS

DE    102015214665 A1    2/2017

OTHER PUBLICATIONS

International Search Report dated Jul. 10, 2019 for Parent PCT Appl. No. PCT/EP2019/060003.

*Primary Examiner* — David P Bryant
*Assistant Examiner* — Christine Bersabal
(74) *Attorney, Agent, or Firm* — James E. Walton

(57) ABSTRACT

The invention relates to a method for handling a rectifier of a turbojet of an aircraft, the rectifier having an axis defining the asymmetry thereof, said method comprising a step of placing the rectifier on the rollers of a supporting structure, the structure and the rollers thereof being arranged such that the axis of the rectifier is inclined at a non-null acute angle in relation to the horizontal, and a step of controlling, maintaining, assembling, handling, storing, deburring and/or cleaning the rectifier, during which the rectifier is pivoted about the axis thereof. The invention also relates to a trolley for handling a rectifier for an axial turbojet, said trolley comprising at least two of the lower rollers that have axes inclined in relation to the horizontal of said angle and at least one upper roller, the axis of which is inclined in relation to the vertical of said angle.

2 Claims, 2 Drawing Sheets

Figure 1:
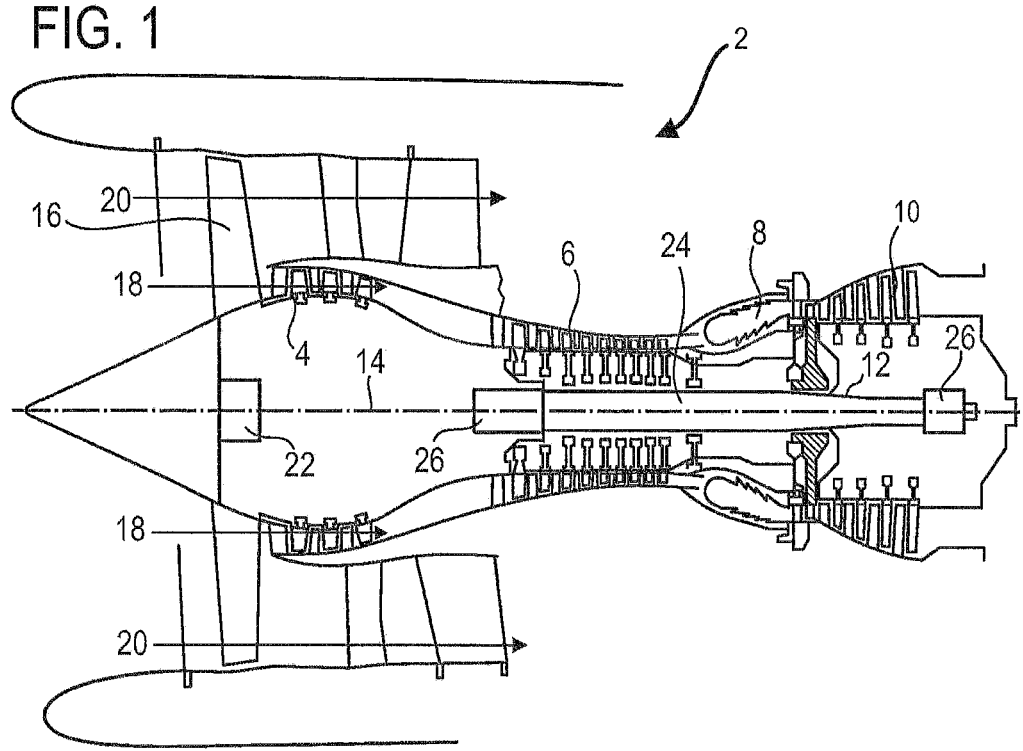

(51) Int. Cl.
  *B66F 5/00*    (2006.01)
  *B62B 3/10*    (2006.01)

(52) U.S. Cl.
  CPC ............ *B66F 5/00* (2013.01); *F05D 2230/60* (2013.01); *F05D 2230/72* (2013.01); *F05D 2230/80* (2013.01)

(56) References Cited

U.S. PATENT DOCUMENTS

| | | | |
|---|---|---|---|
| 4,925,363 A | 5/1990 | Brown et al. | |
| 6,792,809 B1 * | 9/2004 | Moore | F01D 25/285 |
| | | | 73/583 |
| 8,917,090 B2 * | 12/2014 | Bousquet | G01N 27/902 |
| | | | 324/238 |

* cited by examiner

METHOD AND TROLLEY FOR HANDLING A RECTIFIER

TECHNICAL FIELD

The invention relates to the field of handling a rectifier for an axial turbine engine. More specifically, the invention relates to a method and a trolley for handling a rectifier during various assembly or maintenance operations.

BACKGROUND ART

Axial turbine engine compressor rectifiers are assemblies that can weigh several tens of kilos and can measure up to 3 meters in diameter. A number of operations are carried out on rectifiers during their life cycle, such as assembly, storage, maintenance, cleaning, inspection, disassembly, etc. To do this, the rectifiers are handled using a hoist or an overhead crane. This handling method presents risks of accidents for operators or risks of damage to the rectifier. In addition, the rectifier is positioned vertically when it is suspended by the overhead crane, and this is not ergonomic for operators. Finally, the various operations to be carried out on the rectifier are generally carried out on different workplaces or workstations and the handling of the rectifier from an overhead crane to another overhead crane can be tedious and logistically complex.

SUMMARY OF THE INVENTION

Technical Problem

The object of the invention is to solve at least one of the problems encountered in the prior art systems. More specifically, the invention aims to facilitate the handling of a turbojet rectifier, by improving the ergonomics and the safety of the operations which are carried out on the rectifier.

Technical Solution

The subject of the invention is a method for handling a rectifier according to claim 1 and a trolley for handling a rectifier according to claim 6.

The term "handling" is to be considered in its broadest meaning, including handling, storage, control (quality, inspection, approval, etc.), maintenance, assembly, finishing operations (deburring, etc. . . . ), cleaning, etc.

During this process, the rectifier sits in an inclined position relative to the vertical direction and it is pivoted about its axis. It can be pivoted once or several times incrementally to, for example, carry out operations for cleaning successive circumferential portions or operations for assembling blades on the ferrules of the rectifier.

The inclination of the rectifier is particularly important for the ergonomics of the operations that are carried out on the rectifier but also to stabilize the position of the rectifier.

According to preferred embodiments of the invention, the method and/or the trolley can comprise one or more of the following features, taken in isolation or according to all technically possible combinations:
  The structure is fixed to the chassis of a trolley, the method comprising a step of moving the rectifier by means of movement of the trolley. The chassis may include a floor and/or a set of beams and crosspieces, and possibly uprights. Alternatively, the structure can be fixed to a fixed frame;
  The angle of inclination of the rectifier is between 5 and 30°, preferably 10 to 20°, and is preferably 12, 13 or 15°, the method optionally comprising a step of adjusting said angle;
  the structure comprises lower rollers and at least one upper roller, and during the step of positioning the rectifier, the rectifier is placed in contact with the lower rollers and then is tilted to come into contact with the upper roller. During the positioning, an overhead crane can be used, which will no longer be necessary once the rectifier is placed on the trolley. "Lower" and "upper" are to be understood according to their relative vertical position, the lower rollers being positioned in a lower half of the structure, and the upper roller being positioned in an upper half of the structure;
  The rectifier has several annular or circular portions, a first of these portions cooperating with the lower rollers and another of these portions, axially distant from the first portion, cooperating with the upper roller;
  The trolley includes a frame surrounding the structure, the frame having openable elements, and/or a retractable stop. Before the installation of the rectifier, the openable elements are put in the open position and/or the retractable stopper is put in the retracted position, and after the installation of the rectifier, the openable elements are closed and the stopper is placed in the stop position;
  during the control, maintenance, assembly, handling, storage, deburring and/or cleaning step, the rectifier is pivoted about its axis by the actuation in rotation of at least one of the rollers or by manual actuation directly on the rectifier. For example, an electric motor can be integrated into a roller and control and supply means (battery) can be provided on the trolley;
  The rectifier has an outside diameter which is between 1 m and 3 m, preferably close to 1.80 m, and weighs between 50 and 200 kg, preferably around 70 kg; the trolley comprises a structure for supporting the rectifier, the structure having an arrangement of beams on which are positioned support rollers for the rectifier, at least two of the rollers, called lower rollers, being positioned in a lower half of the structure and their axes being inclined relative to the horizontal by a given non-zero acute angle; and at least one of the rollers, so-called upper roller, is positioned in an upper half of the structure and its axis is inclined relative to the vertical of said given acute angle. "Horizontal" and "vertical" can be defined as a characteristic of the trolley regardless of its position in space. The horizontal direction is for example defined by the median straight line of the trolley passing through a plane defined by the lower ends of the wheels of the trolley. The vertical direction is the direction perpendicular to this plane;
  The trolley includes means for adjusting the angle between 5° and 30°. Adjustment can be done by nuts and by a pivot point to rotate the structure. Alternatively or in addition, the position of the rollers on the structure can be adapted to obtain a desired angle, depending on the geometry of the rectifier. The adjustment can be continuous over the entire value range from 5 to 30°;
  The lower rollers each include an external groove;
  The groove defines a first axial portion and a second axial portion, the first and second portions having a different outside diameter;

the groove has two sides, the inclination of which is different from the axis of the roller. This renders easier the insertion of a rectifier disc;

the rollers are mounted to rotate freely on the structure. The rectifier can therefore be manipulated by hand to be pivoted about its axis. Alternatively, one or more drive means (motor, belt, toothed wheel, etc.) can be provided to partially or completely automate the pivoting of the rectifier around its axis;

The trolley comprises at least one upper stop facing an upper roller. This prevents an unexpected tilting of the rectifier;

the stop is retractable to allow to set up or extract the rectifier from the support structure;

The stop is retractable by pivoting, induced by a lever mounted on the structure at a height less than the stop;

the arrangement of beams forms an inverted Y with an upper beam carrying the upper roller and two lower beams carrying the lower rollers;

the upper beam defines an axis of symmetry of the structure;

The upper beam and the lower beams are coplanar along a plane which is inclined relative to the vertical, of said given angle;

the lower beams are fixed to the chassis of the trolley;

the chassis includes a protective frame surrounding the structure and fixed to the beams. In particular the frame can be attached to the lower beams.

the frame includes openable elements to allow the introduction and extraction of the rectifier on the structure. The openable elements can consist of one or more doors pivoting along a vertical or horizontal axis.

the vertical position of the upper roller and/or of the upper beam is adjustable. The beam supporting the upper roller can be made of several telescopic portions. Indexing pins can for example be provided to maintain the vertical position of the upper roller at a desired height. Alternatively or additionally, the vertical position of the lower rollers or their spacing (horizontal distance between the rollers) can be adjusted;

the axis of the upper roller is parallel to the plane of the beams and the distance from the axis of the upper roller to the plane of the beams is adjustable.

In general, the advantageous embodiments of each object of the invention are also applicable to the other embodiments of the invention. Each object of the invention can be combined with the other objects, and the objects of the invention can also be combined with the embodiments of the description, which in addition can be combined with one another, according to all possible technical combinations, unless the opposite is not explicitly mentioned.

Benefits

The method and the trolley according to the invention make it possible to increase the ergonomics of the work of operators, improves safety when handling a particularly heavy, bulky and fragile object. Some aspects of the trolley allow greater flexibility for accommodating rectifiers of various the dimensions, shapes and weights.

SHORT DESCRIPTION OF THE DRAWINGS

Figure 2:
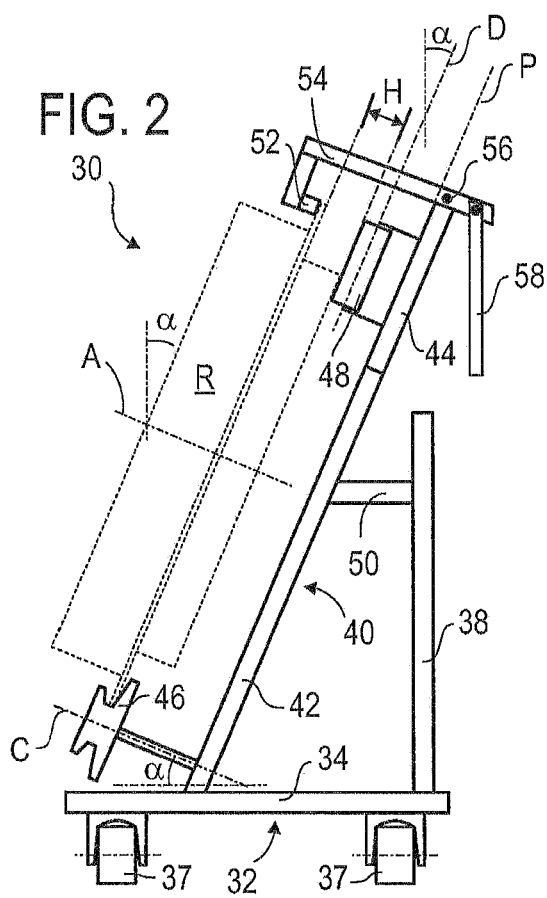
Figure 3:
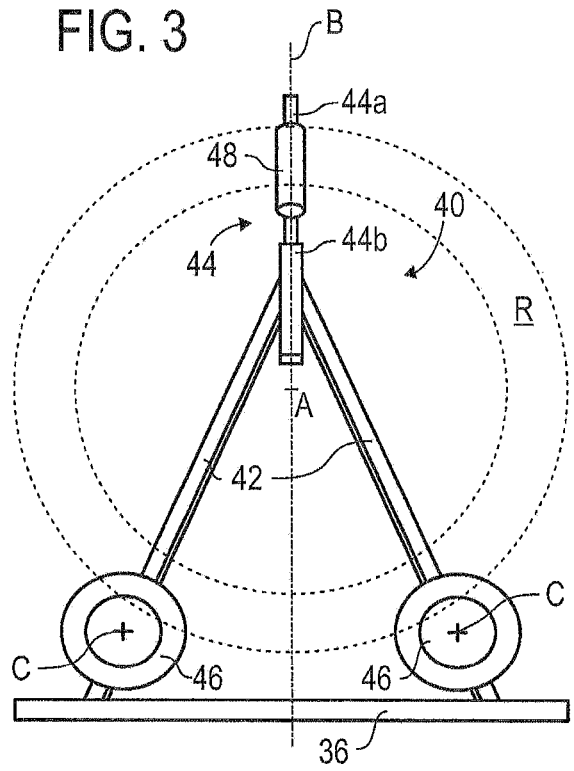
Figure 4:
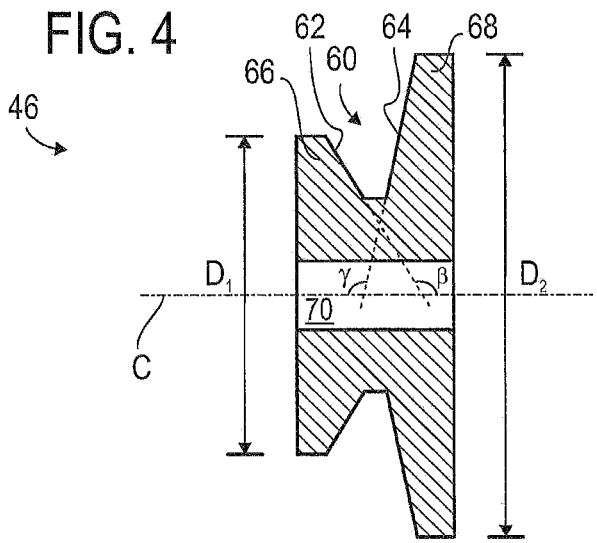
Figure 5:
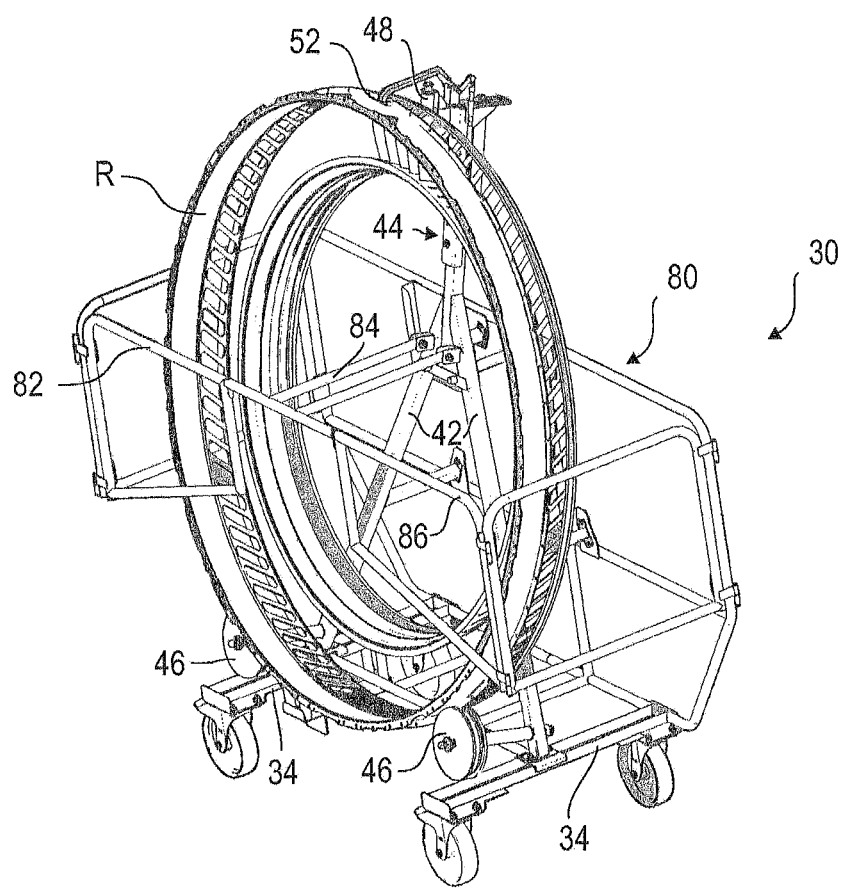

FIG. 1 represents an aircraft turbojet engine;
FIG. 2 shows a side view of the trolley according to the invention;
FIG. 3 illustrates a front view of the support structure of the trolley according to the invention;
FIG. 4 shows a lower roller of the structure of FIG. 2;
FIG. 5 shows an isometric view of the entire rectifier mounted on the trolley according to the invention.

DETAILED DESCRIPTION OF PREFERRED EMBODIMENTS

In the following description, the terms "internal" and "external" refer to a positioning relative to the axis of rotation of an axial turbine engine. The axial direction corresponds to the direction along the axis of rotation of the turbine engine. The radial direction is perpendicular to the axis of rotation. Upstream and downstream are in reference to the main flow direction of the flow in the turbine engine.

The terms "upper" and "lower" refer to the vertical dimension, in the sense of normal use of the trolley of the invention.

FIG. 1 is a simplified representation of an axial turbine engine 2. This is here a double-flow turbojet engine. The turbojet engine 2 comprises a first stage of compression, called a low-pressure compressor 4, a second stage of compression, called a high-pressure compressor 6, a combustion chamber 8 and one or more stages of turbines 10. In operation, the mechanical power of the turbine 10 transmitted to the rotor 12 sets in motion the two compressors 4 and 6. The latter comprise several rows of rotor blades associated with rows of stator blades. The rotation of the rotor around its axis of rotation 14 thus makes it possible to generate an air flow and to gradually compress the latter until the inlet of the combustion chamber 8.

An inlet fan 16 is coupled to the rotor 12 and generates an air flow which is divided into a primary flow 18 passing through the various aforementioned stages of the turbine engine, and into a secondary flow 20 passing through an annular duct (partially shown) along the machine to then join the primary flow at the turbine outlet.

The secondary flow can be accelerated so as to generate a thrust reaction necessary for the flight of an aircraft. The primary flow 18 and secondary flow 20 are annular coaxial flows fitted one into the other. They are delimited by the casing of the turbine engine and/or of the ferrules.

The rotor 12 comprises a transmission shaft 24 mounted on the casing by means of two bearings 26.

Each of the compressors 4, 6 comprises rotating elements (rotor) and fixed elements (stator), superimposed and interposed axially. A rectifier comprises at least one annular row of stator vanes, held by an external ferrule and an internal ferrule.

FIG. 2 describes a trolley 30 according to the invention for the handling operations of a rectifier R. The rectifier R is shown in dotted lines and it has an axis of symmetry A. The trolley 30 can accommodate rectifiers of variable shapes or dimensions and the drawn geometry of the rectifier R is only an illustrative example.

The trolley comprises a chassis 32 made of cross members 34 and side members (36 in FIG. 3). Alternatively, the chassis can also include a solid plate (sole). The chassis also includes an upright 38. The chassis is supported by at least four wheels 37, at least two of which are directional wheels.

A structure 40 is provided to support the rectifier R. The structure has an axis of symmetry B indicated in FIG. 3. The structure comprises beams 42, 44 and rollers 46, 48. The beams can be tubular, of square section, rectangular or round. At least two lower rollers 46 (only one is visible in FIG. 2) of axis C and at least one upper roller 48 of axis D are provided. The lower rollers 46 are fixed to the structure 40 in its lower half and the upper roller 48 is fixed to the structure 40 in its upper half. The lower rollers 46 are fixed to the lower beams 42 and the upper roller 48 is fixed to the upper beam 44. The rollers 46, 48 are free to rotate relative to the beams 42, 44. Axes or supports are provided for this purpose between the beams 42, 44 and the rollers 46, 48. The position and orientation of the rollers 46, 48 can be adjustable to adapt the structure 40 to the geometry of the rectifier R.

The distance denoted H represents the difference between the bearing surfaces of the rectifier R on the lower rollers 46 and on the upper roller 48. By adjusting the position of the upper roller 48 on the upper beam 44, the distance H can be adapted to the geometry of the rectifier. When the beams are coplanar, they can define a plane P. The adjustment of the distance H is equivalent to the adjustment of the distance of the axis of the roller 48 from the plane P.

The assembly of the different elements (beams, rollers, chassis) can be made by welding or by screws.

As described in FIG. 3, the beams 42, 44 form a letter "Y" inverted. The lower beams 42 form an inclined angle with the horizontal. This angle can be between 60 and 80°. The lower beams 42 are fixed to the chassis 32, on a beam 36 or a cross member 34.

The upper beam 44 can allow the height of the upper roller 48 to be adjusted by its telescopic construction with a part 44*a* fixed to the lower beams and a part 44*b* which can slide and be indexed relative to the fixed part 44*a*.

The upper beam comprises an axis (axis of symmetry of the tube) which defines an axis B of symmetry of the structure 40.

Again with reference to FIG. 2, it can be seen that the lower beams 42 are fixed to the upright 38 by means of a support 50.

On the upper part of the trolley 30, a stop 52 prevents the rectifier R from tipping over, out of its inclined position. The stop 52 is carried by an arm 54 which can pivot along a horizontal axis 56 and perpendicular to the plane of FIG. 2. The arm 54 can be pivoted by actuation of a lever 58 which is ergonomically accessible to an operator. The position of the stop 52 can be locked by any suitable means (pin, quick tightening, etc.). The handle 58 can be "stowed" along the beam 44 when it is not in use. This can be done by clipping the handle 58 to the beam 44 or by holding them together thanks to magnets.

Finally, FIG. 2 materializes the inclination of the rectifier by the angle $\alpha$, acute and different from zero. The angle $\alpha$ is the inclination of the axis of the rollers 46, 48 with respect to the horizontal and vertical directions respectively.

In FIG. 3, the structure 40 is shown alone. Indeed, the structure 40 can be used as such without necessarily being integrated into a trolley.

FIG. 4 represents a sectional view of a lower roller 46. The roller has a groove 60 defined by two sides 62, 64. The groove 60 divides the roller into two cylindrical portions 66, 68.

The geometry of the roller 46 is arranged to facilitate the entry and exit of the rectifier. The sides 62 and 64 are inclined differently, and the angles which they form with the axis C of the roller 46 are represented by the angles $\beta$ and $\gamma$. The angle $\beta$ of the sidewall 62 is greater than the angle $\gamma$ of the sidewall 64 Similarly, the diameters D1 and D2 of the axial portions 66 and 68 are different, the diameter of the portion 66 is smaller than that of the portion 68.

The roller 46 may have a through hole 70 to receive an axis or a bearing to connect it to the corresponding lower beam.

FIG. 5 illustrates the trolley 30 with a rectifier R in isometric view. The same reference numbers refer to the same technical features of the trolley. In this example, the trolley 30 includes a frame 80 in the form of welded bars, to prevent collisions with other objects and facilitate handling of the trolley. The frame 80 may include openable elements 82, 84, 86.

The openable elements 82 and 86 open by pivoting about a vertical axis while the T-shaped openable element 84, opens by pivoting around a horizontal axis.

The lower beams 42 can be fixed to a horizontal bar of the frame 80.

In this example, the chassis 32 is formed of two cross members 34 each connecting two wheels to each other, and a central bar connecting the two cross members. Suitable legs or plates are attached to the frame for fixing the lower beams 42. This design allows the rectifier R to be positioned as low as possible on the trolley 30 and in particular the lowest point of the rectifier R can be below the cross members 34. This makes it possible to lower the center of gravity of the assembly and therefore to limit the risks of the trolley tipping over. Also, ergonomics during handling operations are optimized.

In the illustrated example, the rollers 46, 48 are inclined at the angle $\alpha$ relative respectively to the horizontal or the vertical, and this normally results in the inclination of the same angle for the rectifier R. Depending on the geometry of the rectifier, it may be necessary to incline more or to incline less the rollers 46, 48 to ensure an angle of inclination a of the rectifier R. Vice versa, depending on the geometry of the rectifier R, if the rollers are inclined by an angle $\alpha$, the rectifier R may not be tilted by the same angle. These last two situations are not ideal, as they generate friction that may appear at the rollers/rectifier interface when the rectifier is rotated.

The invention claimed is:

1. A trolley for handling a rectifier for an axial turbine engine, the trolley comprising:
    a structure for supporting the rectified, the structure having an arrangement of beams on which are positioned rollers for supporting the rectifier, wherein the rollers comprise:
    at least two lower rollers whose axes are inclined at a non-zero acute angle relative to a horizontal direction and one upper roller whose axis is inclined at said non-zero acute angle relative to a vertical direction;
    wherein the arrangement of beams forms the shape of the letter Y inverted, with an upper beam carrying the upper roller and two lower beams carrying the lower rollers, the upper beam defining an axis of symmetry of the structure;
    wherein the upper beam and the lower beams are coplanar and arranged in a plane which is inclined of said non-zero acute angle relative to the vertical direction.

2. The trolley according to claim 1, wherein the axis of the upper roller is parallel to the plane of the beams and a distance from the axis of the upper roller to the plane of the beams is adjustable.

\* \* \* \* \*